(12) United States Patent
Grandhi et al.

(10) Patent No.: US 8,707,167 B2
(45) Date of Patent: Apr. 22, 2014

(54) HIGH PRECISION DATA EXTRACTION

(75) Inventors: Roonnath Grandhi, Sunnyvale, CA (US); Amir Ashkenazi, Los Altos, CA (US)

(73) Assignee: eBay Inc., San Jose, CA (US)

( * ) Notice: Subject to any disclaimer, the term of this patent is extended or adjusted under 35 U.S.C. 154(b) by 1592 days.

(21) Appl. No.: 11/599,665

(22) Filed: Nov. 15, 2006

(65) Prior Publication Data

US 2008/0115057 A1 May 15, 2008

(51) Int. Cl.
*G06F 17/21* (2006.01)

(52) U.S. Cl.
USPC .......... 715/247; 715/200; 715/201; 715/202; 715/209; 715/248; 715/249; 715/254

(58) Field of Classification Search
USPC .................. 715/200–202, 209, 247–249, 254
See application file for complete search history.

(56) References Cited

U.S. PATENT DOCUMENTS

| | | | | |
|---|---|---|---|---|
| 5,347,619 A | * | 9/1994 | Erb | 345/426 |
| 5,392,428 A | * | 2/1995 | Robins | 707/3 |
| 5,485,566 A | * | 1/1996 | Rahgozar | 715/200 |
| 5,754,712 A | * | 5/1998 | Tanaka et al. | 382/306 |
| 6,006,240 A | * | 12/1999 | Handley | 715/220 |
| 6,078,915 A | * | 6/2000 | Okawa et al. | 707/5 |
| 6,091,841 A | * | 7/2000 | Rogers et al. | 382/132 |
| 6,167,368 A | * | 12/2000 | Wacholder | 704/9 |
| 6,360,011 B1 | * | 3/2002 | Katsumata et al. | 382/181 |
| 6,658,429 B2 | * | 12/2003 | Dorsett, Jr. | 707/104.1 |
| 7,500,188 B1 | * | 3/2009 | Trapani et al. | 715/273 |
| 2001/0004739 A1 | * | 6/2001 | Sekiguchi et al. | 707/100 |
| 2002/0103836 A1 | * | 8/2002 | Fein et al. | 707/531 |
| 2004/0117725 A1 | * | 6/2004 | Chen et al. | 715/500 |
| 2005/0180649 A1 | * | 8/2005 | Curry et al. | 382/243 |
| 2005/0257181 A1 | * | 11/2005 | Wu | 716/4 |
| 2008/0028291 A1 | * | 1/2008 | Vion-Dury | 715/228 |
| 2008/0082497 A1 | * | 4/2008 | Leblang et al. | 707/3 |

FOREIGN PATENT DOCUMENTS

WO    WO 03/098370    * 11/2003

* cited by examiner

*Primary Examiner* — Andrew Dyer
(74) *Attorney, Agent, or Firm* — Schwegman Lundberg & Woessner, P.A.

(57) ABSTRACT

A system receives a document including a plurality of items. The system then processes the document to expose a plurality of item elements associated with one or more items of the document, the item elements including visual information used to render the document. The system then identifies each item of the one or more items based on one or more of the plurality of item elements and corresponding visual information.

20 Claims, 11 Drawing Sheets

HIGH PRECISION DATA EXTRACTION

TECHNICAL FIELD

The technical field relates to extracting data from documents.

BACKGROUND

In the interest of convenience to a viewer of a document (e.g., web page), a document's creator will include multiple items to be rendered on a single page. For example, a catalog page may include various product items and associated data, such as price, size, color, image, etc. It is difficult to separate out the items and their associated data due to the non-conforming and non-standard nature of many document formats. The data (e.g., text and formatting data) underlying a rendered document can be arranged in a multitude of ways and still visually appear identical or at least very similar to a user when rendered. In other words, for the same visual structure there may be many combinations of underlying structure in the code of the document, thus making it difficult to identify patterns and accurately separate the individual items from the group of items and other non-item related data.

BRIEF DESCRIPTION OF THE DRAWINGS

The present invention is illustrated by way of example, and not by way of limitation, in the figures of the accompanying drawings in which.

DETAILED DESCRIPTION

Figure 1:
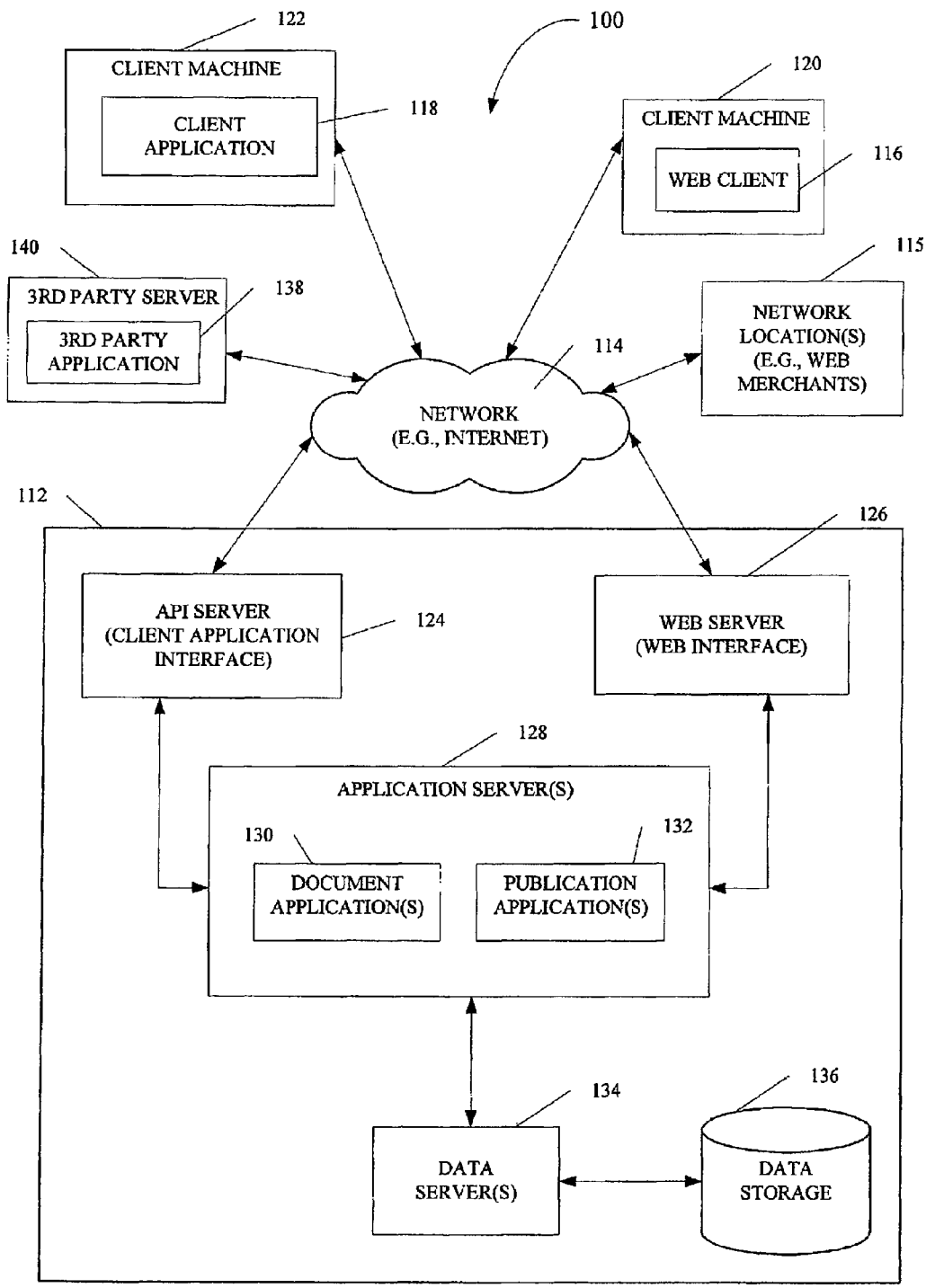
FIG. 1 is a network diagram depicting a network system, according to one embodiment, having a client-server architecture configured for exchanging data over a network.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

As used herein, "document" is defined as a data file that may include one or more sets of electronic data (data), including data stored on a portable tangible medium (e.g., compact disc (CD), flash drive, etc.) and/or data received over a network (e.g., the Internet). The electronic data may include, but is not limited to, data types such as encrypted and non-encrypted text files, audio/visual files (e.g., music, video, and speech), network links (e.g., URL—uniform resource locator), etc. The electronic data of a document may further be sectioned or grouped into "item data." For example, a document may have three sections corresponding to "items" and associated item data. The items, for example, may be a product listing, a review, and a frequently asked question (FAQ), each item including its associated item data, such as product description and image, price, question, review text, etc. Each section of item data may include some or all the data types discussed above with reference to the electronic data.

A "subdocument" is a subset of a document that has been extracted or broken out of a document and includes item data corresponding to an item located in the document. A subdocument may be extracted for each item and associated item data in the document. Additionally, a document and subdocument may include appended metadata. "Metadata" is information that is not included in the original document and may be used to "tag" the document with "document context" data. Document context data is relevant data that may be appended to the document to facilitate operations on the document, such as indexing and searching. For example, metadata may be added as a "document context" data to a subdocument to distinguish its content from the content of another subdocument in a key word search.

A "data store" is a data repository (e.g., a data server) that contains the original documents and extracted subdocuments. An "index" is a data structure that identifies documents (subdocuments) in the data store that are associated with specific data of the document. For example, a search engine may process every word of three documents and add those words to an index. Each word indexed is associated with at least one of the processed documents and in some cases all three documents. After which, if a search for a particular word or words is made the system refers to the index and retrieves each document (subdocument) from the data store associated with the word or words (search term(s)). The indexing is not limited to text or words but may be applied to any data (e.g., images, metadata, etc.) that may be processed into an index data structure. "Relevancy" is a term to describe the results of a search utilizing a ranking process to sort a search of the index. Various ranking processes may be applied to attempt provide a user with the most relevant documents (subdocuments) based on the search request (query).

In one embodiment a document is rendered in a breaking process to expose a plurality of visual elements. The document may include one or more items, such as a product list, and item data associated with each product. For example, the item data may include images and/or text, (e.g., price, description, product name, etc.). Each item may then be identified based on one or more of the plurality of visual elements. In one embodiment, the breaking process includes creating a subdocument for each identified item and its corresponding item data. The subdocuments may be further processed for storage, recall and display. In one embodiment, processing may include appending metadata to each subdocument and creating an index to facilitate the retrieval of the subdocument in a subsequent search request.

For simplicity, the documents referred to hereinafter refer specifically to markup language documents (e.g., hypertext markup language (HTML) web pages). However, it can be appreciated that the systems and methods of the various embodiments described herein may work independently of the programmatic language (e.g., HTML) or written language (e.g., English, Chinese, etc.) of the document and can be extended to many other programmatic and written languages. Additionally, these and other embodiments may be adapted to other information/data extraction problems, such as item review extraction, frequently asked question (FAQ) extraction, etc., which may require the recognition of repeated visual patterns in a tabular structure on a web page document.

FIG. 1 is a network diagram depicting a network system 100, according to one embodiment, having a client-server architecture configured for exchanging data over a network. For example, the network system 100 may be a publishing system where clients may communicate, view, search, and exchange data with the publishing system. The data may pertain to various functions and aspects associated with the network system 100. For example, a user may submit a search request for digital cameras that may be sorted according to user defined attributes, such as price (e.g., lowest to highest), merchant, or show only results including images.

A data exchange platform, in an example form of a network-based provider 112, provides server-side functionality, via a network 114 (e.g., the Internet) to one or more clients. The one or more clients may include users that may utilize the network system 100 and more specifically, the network-based provider 112, to exchange data over the network 114. User transactions may include receiving and processing item data from a multitude of users, such as review data, search request data, feedback data, etc.

Additionally, the network-based provider 112 may include data collection functionality to retrieve data from a plurality of sources, such as network locations 115 (e.g., merchants, etc.). The data may include, but is not limited to, item related data, such as item listings (products and services), item reviews, item categories, links associated with items, feedback, etc. In one embodiment, a user initiates a search via a request for an item or item related data and the network-based provider 112 returns a list of most relevant items and associated supporting data (e.g., price, merchant, etc.). The network-based provider 112 may, for example, obtain at least a portion of the item data by searching locations over the network 114 (e.g., a web crawler on the Internet) for documents containing one or more instances of relevant item data and breaking that document into multiple subdocuments corresponding to each item and associated item data. The subdocuments may then be indexed into a system such as the network system 100. In another embodiment, the network-based provider 112 receives the document through other means known in the art, such as by transmission or digital media including but not limited to hard drives, floppy disks, memory sticks and the like.

Turning specifically to the network-based provider 112, an application program interface (API) server 124 and a web server 126 are coupled to and provide programmatic and web interfaces respectively to one or more application servers 128. The application servers 128 host one or more document applications 130 and marketplace applications 132. The application servers 128 are, in turn, shown to be coupled to one or more databases servers 134 that facilitate access to one or more database(s) 136.

In one embodiment, a user initiates a search via a search request communicated to the network-based provider 112. In response, the network-based provider 112 returns a list of most relevant items including associated item data (e.g., price, merchant, FAQ data, etc.). Specifically, the network-based provider 112 utilizes application servers 128 and data server(s) 134 to search an index to retrieve the most relevant documents and subdocuments including item data from a data store. In one embodiment, the index and the data store are located on data storage 136. However, it can be appreciated the index and data store may be located remotely or locally on one or more storage mediums.

In one embodiment, the network-based provider 112 may obtain documents and subdocuments of item data by searching network location(s) 115 over the network 114. For example, the search may be done utilizing a web crawler searching over the Internet. A document containing multiple instances of item data may then be retrieved and broken into one or more subdocuments corresponding to each instance of item data (e.g., FAQ, review, product, etc.). The multiple subdocuments may then be indexed and stored in the data storage 136.

Optionally, prior to storing the subdocuments, the subdocuments may be appended with data, such as metadata, which may be included in the index and associated with the subdocuments. In various embodiments, the metadata may be derived from specific data of the item data or other data pertaining to the document. It can be appreciated the network-based provider 112 may receive the document through other means known in the art, such as by transmission or digital media including, but not limited to, hard drives, floppy disks, memory sticks and the like.

An application program interface (API) server 124 and a web server 126 provide programmatic and web interfaces to one or more application servers 128. The application servers 128 may host one or more other applications, such as document applications 130 and publication applications 132. The application servers 128 are may be coupled to one or more data servers 134 that facilitate access to one or more storage devices, such as the data storage 136.

The publication applications 132 may include various modules to provide a number of publication functions and services to users that access the network-based provider 112. For example, these services may include, inter alia, formatting and delivering search results to a client. The document applications 130 likewise may provide a number of document processing modules to facilitate processing retrieved documents and their associated item data into subdocuments. For example, the modules functions may include, inter alia, web crawling, indexing, breaking a document into subdocument(s), storing, searching, etc.

FIG. 1 also illustrates a third party application 138, which may operate on a third party server 140 and have programmatic access to the network-based provider 112 via the programmatic interface provided by the API server 124. For example, the third party application 138 may utilize various types of data retrieved from the network-based provider 112 and support one or more features or functions normally performed at the network-based provider 112. For example, the third party application 138 may receive a copy of all or a portion of the data storage 136 that includes the index and the data store. Consequently, the third party server 140 may then provide a response to a search query in a similar fashion to the network-based provider 112 as discussed above. Additionally, in another embodiment, similar to the network-based provider 112, the third party application 138 may also include modules to perform operations pertaining to web crawling, indexing, breaking a document into subdocument(s), storing, searching, etc. In yet another embodiment, the third party server 140 may collaborate with the network-based provider 112 by sharing retrieved document data, such as whole documents, created subdocuments, index data, etc.

Figure 2:
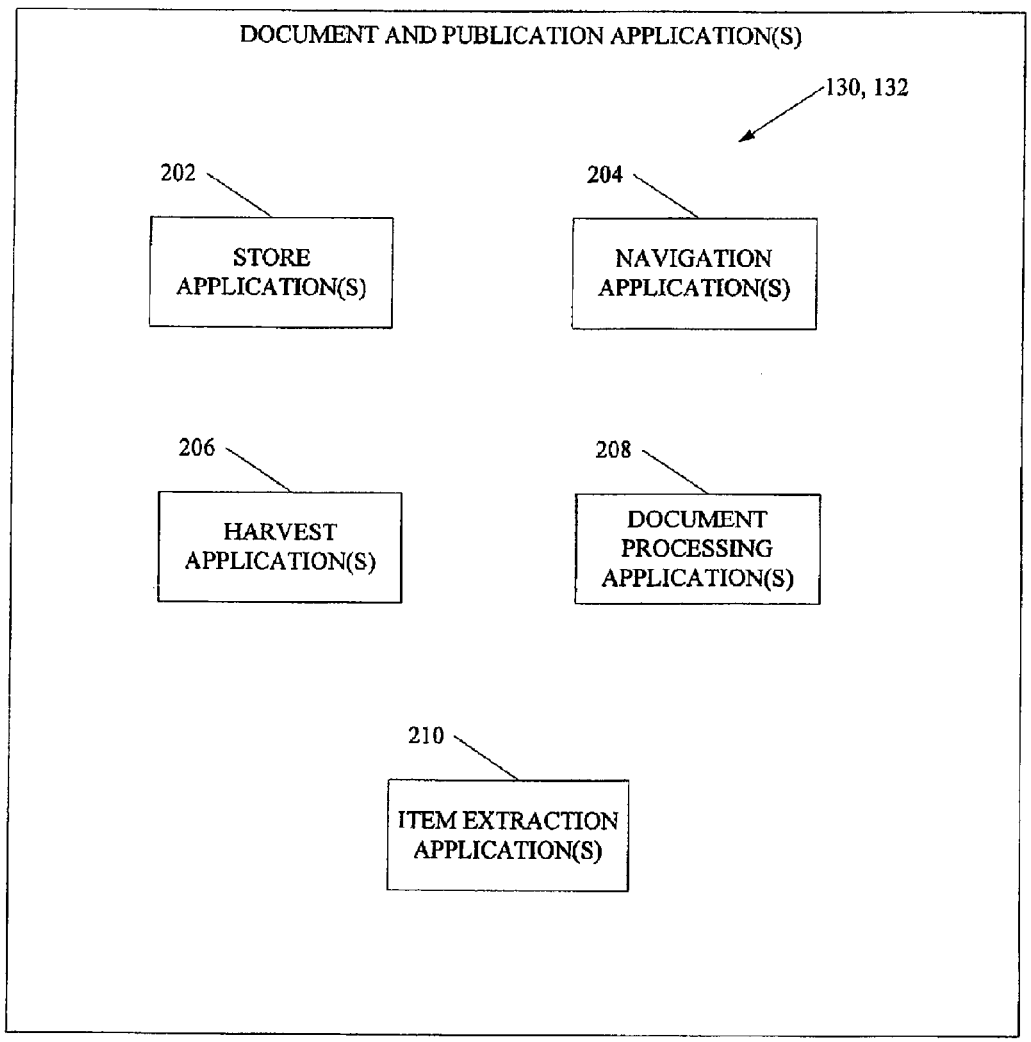
FIG. 2 is a block diagram illustrating an example embodiment of multiple document and publication applications, which are provided as part of a network-based provider.

FIG. 2 is a block diagram illustrating an example embodiment of multiple document and publication applications 130 and 132, respectively, which are provided as part of the network-based provider 112. The network-based provider 112 may provide a number of searching, document-processing, shopping, and listing mechanisms. For example, documents may be received and broken into subdocuments of items (e.g., products) using an extraction process based on processing the rendered document. In another example, a user may search, view, compare and select via a user interface various items from a list of items and/or related item data associated with one or more indexed subdocuments. The selection of an item may include a multitude of responses from the network-based provider 112. For example, a user selection (e.g., via a selectable link) from an item list of relevant subdocuments created from a search of the index may result in the entire selected subdocument being returned from the data store and displayed to the user. In another embodiment, all the relevant subdocuments are returned to the user's machine (e.g., client machine 122) and the user selects from a locally generated item list.

To this end, the document and publication applications 130 and 132, respectively, are shown to include one or more applications which support the network-based provider 112, and more specifically the obtaining and breaking documents by extracting items into multiple subdocuments. In various embodiments, the index and the subdocuments may be maintained stored in searchable mediums, such as a central data storage device (e.g., data storage 136), local machine (e.g., client machine 120, 122), or stored in a distributed fashion among various peer machines (e.g., in a peer to peer network).

In one embodiment, store applications 202 allows sellers to provide their documents and associated item data (e.g., FAQs, product and service reviews, etc.) to the network-based provider 112. The item data may be branded and otherwise personalized by and for the sellers (or manufacturers) and include, inter alia, links to specific products, reviews, FAQs, and images. In one embodiment, a seller may provide access (e.g., login credentials) to the network-based provider 112 to their network location (e.g., website) to retrieve documents to break, index and store. In another embodiment, item data (text, images, metadata, etc.) may be provided by a document source (e.g., merchant or manufacturer) to supplement documents previously retrieved from the network (e.g., Internet) or other location (e.g., computer disk). For example, an item of brand X retrieved from a source (e.g., web page) may be displayed to a requesting user with supplemented data provided by the source (e.g., logo, links, etc.). In one embodiment, the source may pay a fee to the network-based provider 112 to add the supplementary data.

Navigation of the network-based provider 112 may be facilitated by one or more navigation applications 204. For example, navigation applications 204 may provide a user with a user interface (UI) for keyword or context queries (searches) of the indexed subdocuments, including products, services, reviews, frequently asked questions (FAQs), etc. In one embodiment, the search request data (e.g., keyword(s), image data, etc.) is matched to a document context (e.g., metadata, title, etc.) associated with the indexed and stored subdocuments.

The navigation applications 204 may also provide a user interface (UI) to browse search results by category, date, etc. In one embodiment, this includes the creation of a subdocument listing associated with a search (via query or request). The listing may be based on a matching the search with one or more document contexts used by the system to locate relevant subdocuments in the index. In various embodiments, document contexts associated with a subdocument may be any one of combination of manufacturer, provider, model, technical details of the item, item rating (e.g., star rating), review titles, etc. The UI associated with the subdocument listing may include various functional controls and links. For example, it may include a link to advertisers or merchants associated with one or more document contexts associated with the retrieved subdocument. In one embodiment, a sponsor may pay to have their link(s) displayed on the UI.

Searching and retrieving documents from one or more networks, such as the Internet, may be facilitated by the network-based provider 112 using one or more harvest application(s) 206. In one embodiment, the harvest application(s) 206 systematically retrieves documents (e.g., web documents) from a multitude of network sites (e.g., merchant site) and/or other storage locations. A module may be programmatically configured to periodically retrieve documents from a preconfigured list of sources (e.g., merchants, reviewers, etc.) or generate destination URLs (uniform resource locator) based on one or more crawling process.

The classification and rendering of received documents is facilitated by one or more document processing application (s) 208. These applications may determine if the document (e.g., web page) is an item-list document or a non-item-list document. Simple statistics may be used to determine whether the document is rejected as a non-item-list document or accepted as potential item-list document for further processing. The accepted documents may then be rendered in one of the document processing application(s) 208 to extract visual information. For example, the document may be an html (hypertext markup language) document rendered in an application such as a web browser. The visual information may include, but is not limited to, position information (e.g., html element position), font, text size, etc.

Additionally, the document processing application(s) 208 may be used to identify the potential product regions in the document. Continuing with the web page example, each product region is a visual area in the web page where items are listed in tabular format (e.g., combination of horizontal and vertical rows). The functions of the document processing application(s) 208 are discussed in further detail below.

Breaking and indexing retrieved documents may be facilitated by the network-based provider 112 using one or more item extraction application(s) 210. The item extraction application(s) 210 may include one or more modules that process a single document containing multiple items (e.g., product, review, FAQ, etc.) into corresponding multiple subdocuments. The document may be in structured to include sections corresponding to each item. The sections may include visual elements that when rendered serve as break points between each item in the document. Based on the analysis of those rendered visual elements the document may be broken into subdocuments for each item. The breaking operation may include one or more process to determine which portions of the document correspond to items and which to non-items. For example, the item extraction application(s) 210 may determine which portions of the document are associated with an item (e.g., product, service, review, FAQ, etc.) and which portions are associated with non-item related data (e.g., site index link, etc.). The item may be broken out into subdocuments while the non-item data may be ignored.

The item extraction application(s) 210 may include one or more modules to break a retrieved or received document into subdocuments, add one or more document contexts (e.g., metadata), and index and store the subdocuments. As mentioned above, the document context may be associated with a particular item. The document context may be derived based on analyzing the item data of the subdocument and/or data of the original document. For example, the title of a document may be "Reviews for a 5 megapixel Canon® camera," and include 3 reviews. The three reviews are broken out into subdocuments and a document context of "5 megapixel Canon® camera" may be appended as metadata to each subdocument. In another embodiment, additional metadata may be appended to provide additional scope for indexing. For example, "camera," "digital camera," and "5 megapixel," may be appended to each subdocument as metadata. The subdocuments including the metadata may be indexed and retrieved from a data store based a search query applied to the index.

It will be appreciated that one or more of the various example document and publication applications 130, 132 may be combined into a single application. Further, in some embodiments, one or more applications may be omitted and additional applications may be included and some or all of the functionalities of document and publication applications 130, 132 may be implemented in one or more applications operating on the network-based provider 112, a client machine (e.g., client machine 122), or across multiple networked clients, such as clients operating in a peer to peer configuration.

Figure 3A:
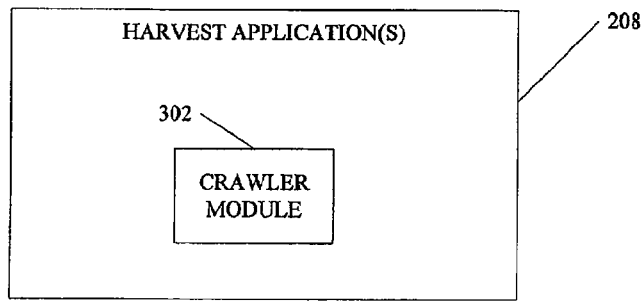
FIGS. 3A, 3B, and 3C illustrate example embodiments of specific applications and their associated modules to locate and retrieve documents on a network, pre-process the documents, and break the documents into two or more subdocuments corresponding to extracted items using rendering and extraction processes.
Figure 3B:
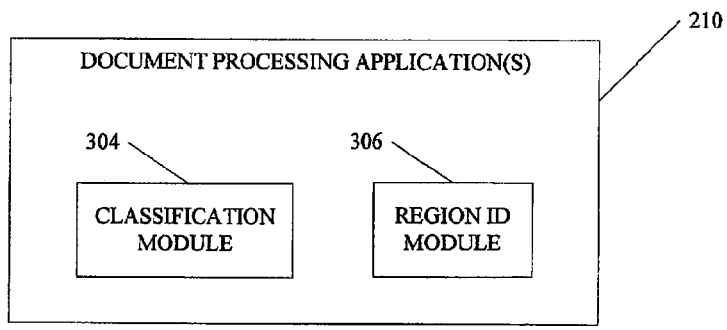
Figure 3C:
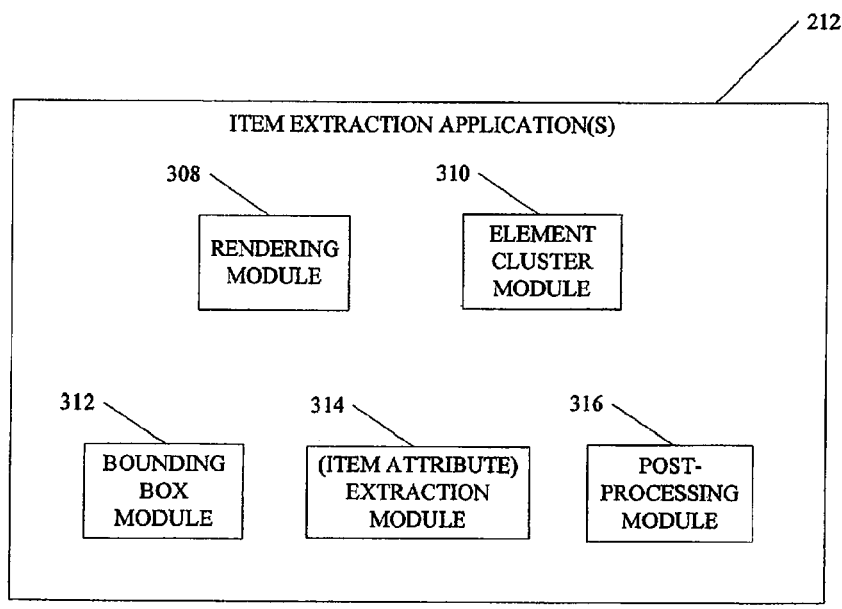

FIGS. 3A, 3B, and 3C illustrate example embodiments of specific applications and their associated modules to locate and retrieve documents on a network, pre-process the documents, and break the documents into two or more subdocuments corresponding to extracted items using rendering and extraction processes described herein. FIGS. 4A through 4D, according to one embodiment of the invention, illustrate an example of a web page document processed to extract the items into subdocuments using the various applications and modules described herein.

FIG. 3A illustrates an example embodiment of a crawler module 302 associated with the harvest application(s) 206. The crawler module 302 may be configured to search a network (e.g., the Internet) for documents (e.g., web documents) to retrieve, break, index, and store. The crawler module 302, for example, may be configured to search specific document source locations based on various search parameters, such as domain name or specific network address (e.g., URL). In various embodiments, the crawler module 302 may be configured to randomly select source locations (e.g., domains) and search based on a preconfigured list of sources (e.g., domains—merchant.com). The crawler module may then acquire documents from the sources respective subdirectory structures or search only those locations on a preconfigured list. In another embodiment, the harvest application(s) 206 may receive documents from a document storage device operated by the network-based provider 112 or a third party crawling and storage system.

FIG. 3B illustrates an example embodiment of a classification module 304 and a region ID (identification) module 306 associated with the document processing application(s) 208. Documents may be pre-processed by the classification module 304 to determine if it meets a defined class of documents to be processed by the item extraction application(s) 212. For example, a web document (e.g., HTML document) may be processed to determine if it falls under the classification of an item-list page. In one embodiment, the classification module 304 uses a DOM (document object model), which describes how an HTML or XML (extensible markup language) document is represented in a tree structure. The DOM provides an object oriented API (application program interface) that allows parsing HTML or XML into a well defined tree structure and operate on its contents. Thus, the classification module 304 may use the DOM and statistical analysis of the DOM contents to determine if the web page document is an item-list page. For example, if an analysis of the DOM sub-tree/tree determines there are a threshold number characters corresponding to prices (e.g., "$"s), the document may be processed as an item-page. In various other embodiments, other attributes of the DOM may be examined in the analysis, such as table structures, images, etc. In one embodiment, if the minimum threshold of characters, for example, is not met in the DOM sub-tree, then the classification module 304 may move up tree structure (e.g., to the parent branch of the sub-tree) and similarly processes that portion to determine if it meets the threshold criteria and so on until either the web page document is classified as an item-list page or a non-item list page and discarded.

Once identified as a potential item-list page, the region ID module 306 may use table information of the DOM to determine potential item-list regions in the web page document. This includes finding common ancestors of the DOM tree that satisfies a threshold of items in the sub-tree using hints, such as the count of images and "$" characters within the sub-tree. For example, referring to FIG. 4A, the region ID module 306 may process the DOM of a web page document 402 in the form of a web page to identify potential item-list regions 404 and 406. Although described and illustrated herein in the English language, the system and methods including processes described herein may operate equally as well in other languages, such as Chinese, German, Japanese, etc. Thus, in other embodiments, other characters may be counted regardless of language, such as price symbols corresponding to other regions' currencies (e.g., yen, etc.).

Returning to FIG. 4A, each item-list region may be a visual area in a document where items are listed in tabular format, such as the combination of horizontal and vertical rows in item-list region 404 and the vertical row in item-list region 406. As illustrated, the item-list region 404 and the item-list region 406 include prices (e.g., text including "$" characters), images, and text. However, non-item-list region 408 may be excluded based on analyzing the corresponding portion of the DOM to determine it does not include attributes corresponding to items, such as images, prices, etc.

The item extraction application(s) 212 in FIG. 3C include a rendering module 308, an element cluster module 310, bounding box module 312, an (item attribute) extraction module 314, and a post-processing module 316. It can be appreciated that the modules listed are merely for example and in various embodiments the processes carried out by these modules may be combined into fewer or more than the example modules provided herein.

The rendering module 308 and the element cluster module 310 may be used to process the identified visual regions (e.g., item-list regions 404 and 406) and to identify element clusters within those regions. For example, referring again to FIG. 4A, item-list region 404 has been separated out into a web page document 410 and item-list region 406 has been separated out into a web page document 413 including all the attribute information corresponding to the item elements of the item-list region 404 and the item-list region 406, respectively. Once an item-list region has been identified, the element cluster module 310 may then estimate the number of items in the vertical and horizontal direction based on identifying repeating element clusters. For example, for the webpage document 410, the element cluster module 310 may analyze the HTML element of item-list region 404. Specifically, for a given element, such as price, the element cluster module 310 may determine based on attributes (e.g., position, font, and text size) of the price elements an estimate of how many items are in the horizontal direction and how many items are in the vertical direction. As illustrated on the webpage document 410 in FIG. 4A, the item-list region 404 has two items in the horizontal direction and two items in the vertical direction. In other embodiments, there may be only items in the vertical direction or only items in the horizontal direction. For example, in the webpage document 413 the item-list region 406 has three items only in the vertical direction.

Element clusters may be found in the product regions in the vertical and horizontal directions. Each element cluster may be associated with a HTML element conforming to certain rules. Example element clusters are price clusters, image clusters, anchor tag clusters, and text clusters. The size of an element cluster is the number of elements belonging to that cluster. In one embodiment, the element clusters are formed such that the size of the cluster is equal to the number of estimated products/deals in a given direction (e.g., horizontal and vertical). Element clusters are generated by the element cluster module 310 using features including visual information of each element, such as position, font and text size.

For example, the element cluster module 310 examines the item-list region 404 in the vertical direction and identifies a price element cluster 412 for the first column and price element cluster 414 for the second column. In various embodiments, there may multiple cluster types in each column. For example there may be multiple price clusters in each column (e.g., sale price, shipping price, etc.). The element cluster module 310 may, in a similar fashion, identify additional element clusters, such as an image element cluster including image 1 and image 3, an anchor tag element cluster including anchor tag 1 and anchor tag 3, and a description element cluster including description element 1 and description element 3 and so on. Hereafter, references to items by number correspond to those items having elements of the same number. For example, a reference to item 2 corresponds to the item having image 2, anchor tag 2 and so on.

Figure 4A:
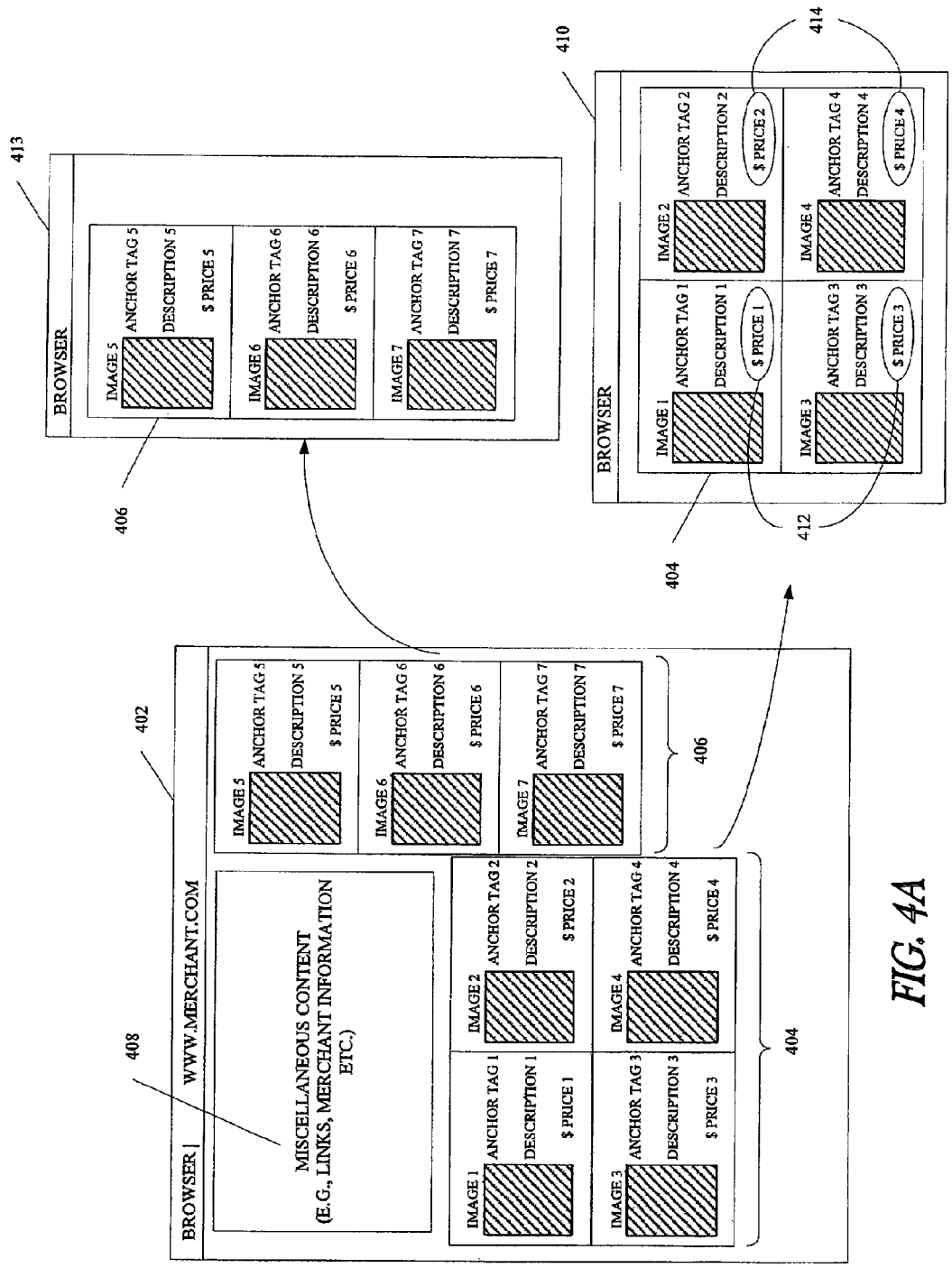
FIGS. 4A through 4D, according to one embodiment of the invention, illustrate an example of a web page document processed to extract items into subdocuments.
Figure 4B:
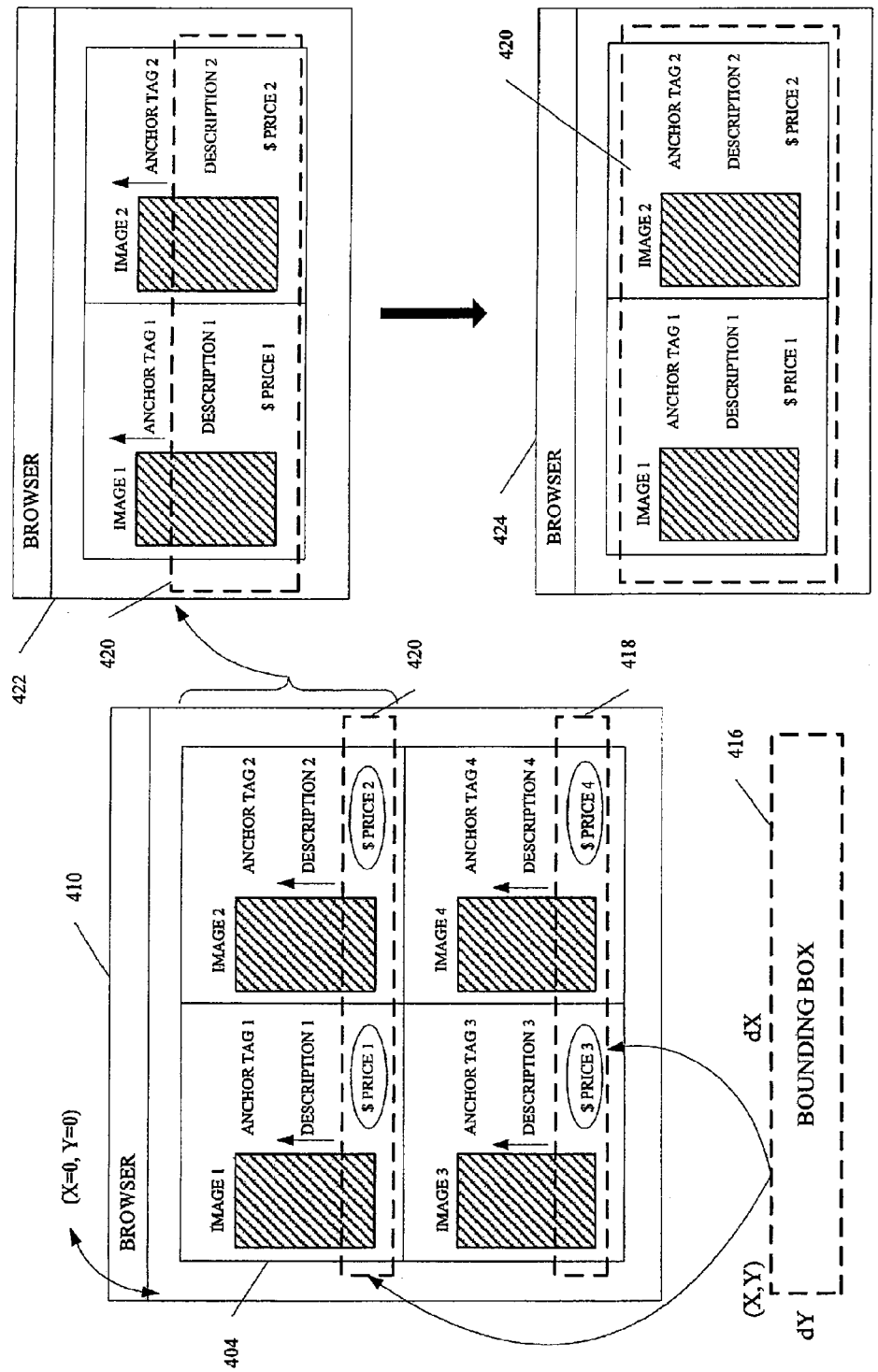

The element clusters identified in the vertical and horizontal direction are used in conjunction with a bounding box to segment items spatially in a vertical or a horizontal direction. FIG. 4B illustrates an application of a bounding box to an item-list region to isolate the items listed in a horizontal direction. FIG. 4B includes an example bounding box 416, as may be created by a bounding box module 312, having a starting position of X,Y and a size of dX and dY. In one embodiment, the starting position X,Y is relative to origin coordinates X=0 and Y=0 as defined in the rendered web page document 410 at the top left hand corner. However, in other embodiments, the origin coordinates may be located at any point within the rendered document, such as the center, bottom right corner, etc., and although the bounding box as illustrated is rectangular, it may be defined by any shape bounded in the coordinate system. In this illustrated example, bounding boxes 418 and 420 are constructed in a vertical direction to segment the items regions spatially in the vertical direction. Based on the estimated number of items as determined with reference to FIG. 4A, the bounding box module 312 creates a corresponding number of initial bounding boxes in the vertical direction. For example, the estimated number of products in the vertical direction for the item-list region 404 is two. Thus, the bounding box module 312 initializes two bounding boxes, 418 and 420 to have an initial height (dY) of zero and a width equal to the width of the product region. The height may then be updated according to the identified element clusters (e.g., price element clusters). As illustrated in the web page document 410, the bounding box 420 is updated in the vertical direction (dY) to include price element 1 from the price element cluster 412 ("$price1") and price element 2 from the price element cluster 414 ("$price2") based on the price elements position data. The bounding box 418 is similarly updated as shown.

As shown in web page document 422 and web page document 424, the bounding box 420 is updated in the vertical direction to include each identified element clusters. In this case, the description element clusters (description element 1 and 2), the anchor tag element clusters (anchor tag 1 and 2), and the image element clusters (image 1 and 2). The bounding box 418 is similarly updated to include all the element clusters corresponding to items 3 and 4 and would result in a web page document (not shown) similar to that of web page document 424. The exact order in which these clusters are used to update each bounding box is not critical and the same results may be achieved by updating the bounding box using any order of the element clusters.

An overview of an example embodiment of the processing operations may be stated as follows:
1) Initialize N bounding boxes ($B_i$) (i=1 . . . N), the width to be width of the item-list region and the initial height equal to zero.
2) For each element cluster $E_t$ in the vertical direction:
   For each bounding box $B_i$ use the bounding box of the member $E_{ti}$ to update the bounding box $B_i$ such that the bounding box of $E_{ti}$ is contained in the bounding box $B_i$
   End
   End
3) Repeat the process in a horizontal direction for the items within each bounding box $B_i$ created in operation 2.

Figure 4C:
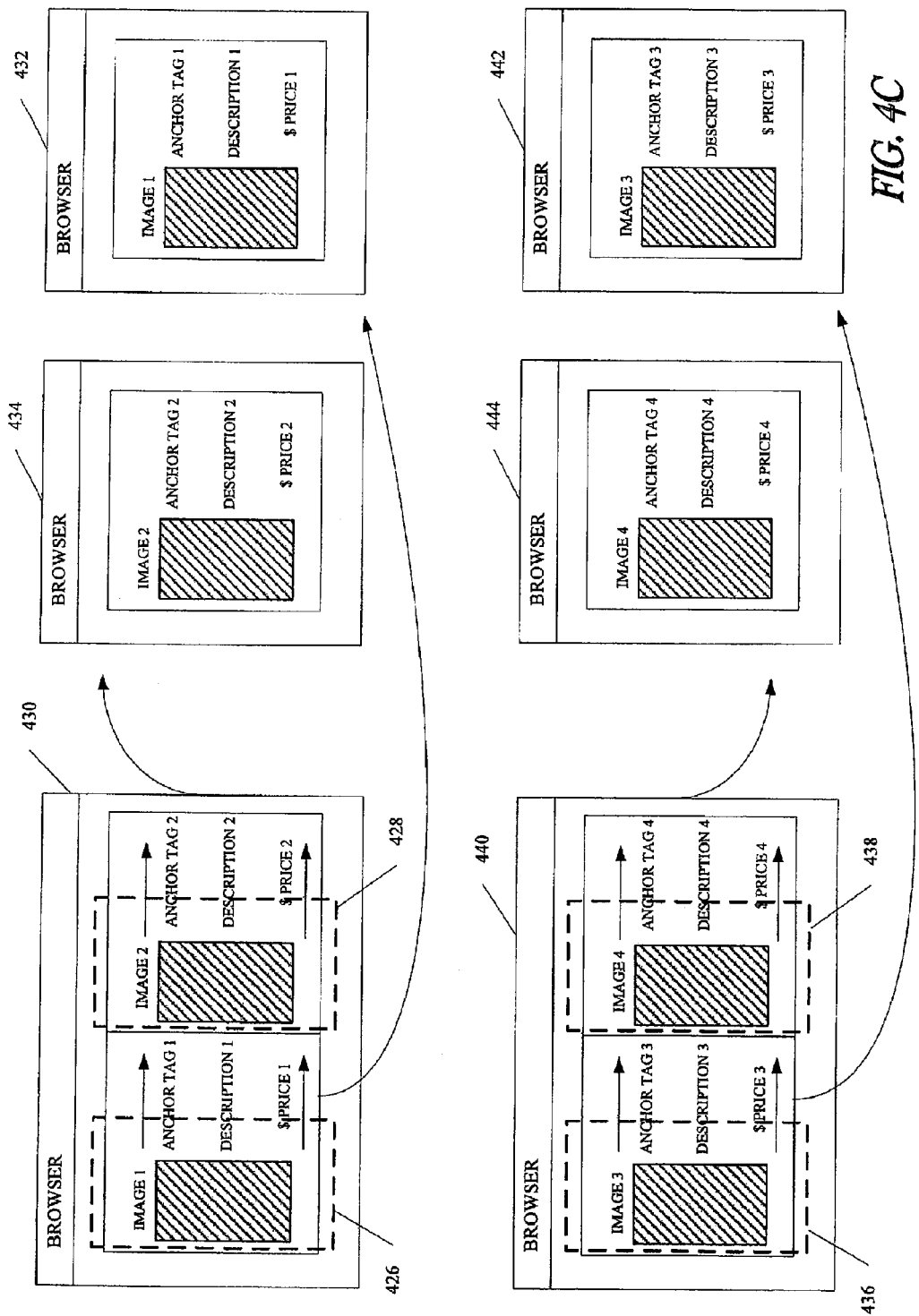

FIG. 4C illustrates an example embodiment of updating a plurality of bounding boxes in a horizontal direction to isolate each item into its own respective bounding box. In one embodiment, the bounding boxes 426 and 428 of web page document 430 are initialized with a height (dY) equal to the size of the item-list region as defined by the bounding box 420 of web page document 424 and a width (dX) of zero. In this example diagram, the initial position is based on the position information of a first image element cluster (image 1) and a second image element cluster (image 2). The bounding boxes 426 and 428 may then be updated until all the members of the element clusters associated with each item are accounted for within each bounding box. As previously mentioned, the exact order in which these element clusters are used to update each bounding box is not critical and the same results may be achieved by updating the bounding box using any order of the element clusters.

The resulting bounding boxes 426 and 428 that account for each element cluster of each item result in a separate web page subdocument for each item. For item 1 a web page subdocument 432 and for item 2 a web page subdocument 434. Similarly, bounding boxes 436 and 438 of web page document 440 are updated until each bounding box accounts for corresponding members of the element clusters associated with each item resulting in a separate web page subdocument 442 for item 3 and web page subdocument 444 for item 4.

Figure 4D:
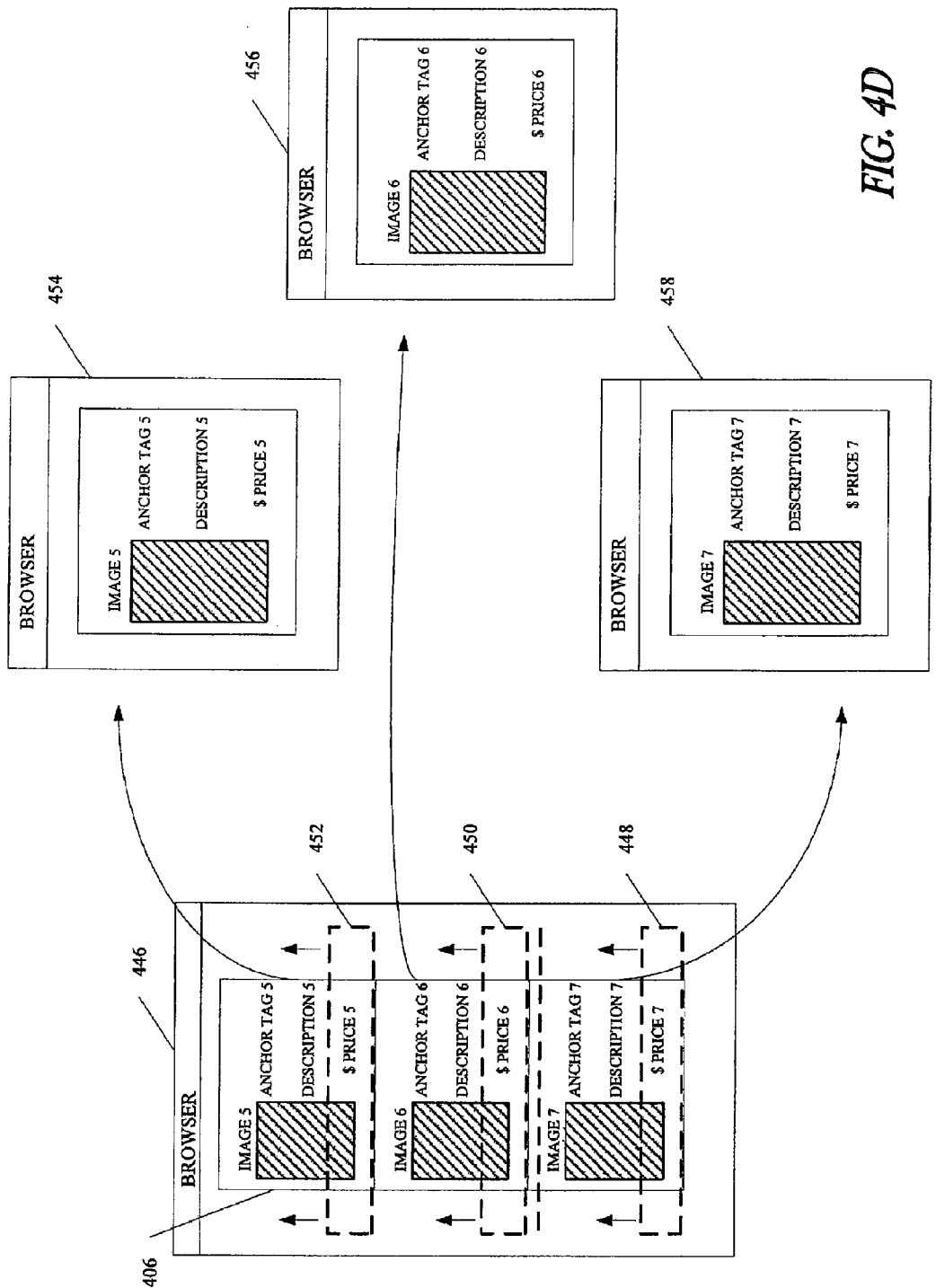

FIG. 4D illustrates an example embodiment of using bounding boxes to extract items 5, 6, and 7 of item-list region 406. As previously discussed, the number of items in the item-list region was estimated by the element cluster module 310, in this case three items were estimated based on analyzing the item-list region 406 for repeating elements (e.g., price elements). Therefore, three bounding boxes 448, 450, and 452 within web page document 446 are initialized, the initial width (dX) equal to the size of the item-list region as defined by the identified item-list region 406 and a height (dY) of zero. The bounding boxes 448, 450, and 452 may then updated until all the element clusters associated with each item are accounted for within each bounding box.

The resulting bounding boxes 448, 450, and 452 that account for each element cluster of each item result in a separate web page subdocument for each item. For item 5 a web page subdocument 454, for item 6 a webpage subdocument 456, and for item 7 a web page subdocument 458.

In one embodiment, after each bounding box has isolated an item, the extraction module 314 extracts relevant attributes of the item. For example, the attributes of an item may include, but not be limited to, item image, item price, item name, and item description. The extraction module 314 may identify potential candidates (e.g., from the item elements) and apply one or more rules to select relevant candidates for each attribute. For example, a rule may identify and select an item price attribute based on 1) locating a dollar ($) character within an item element and 2) extract only those characters not having a font of strikethrough.

A post-processing module 316 may further process the identified relevant attributes to ensure a high level of consistency and precision is maintained for the extraction process. For example, the post-processing module 316 may reject the item(s) if the text size of the attribute in one item is not consistent with the text size of that attribute in other items. In one embodiment, after the individual items and their respective attributes have been isolated from the original document into subdocuments, the subdocuments may then be indexed and stored. Once indexed and stored, one or more subdocuments may then be retrieved based on a search of the index.

Figure 5:
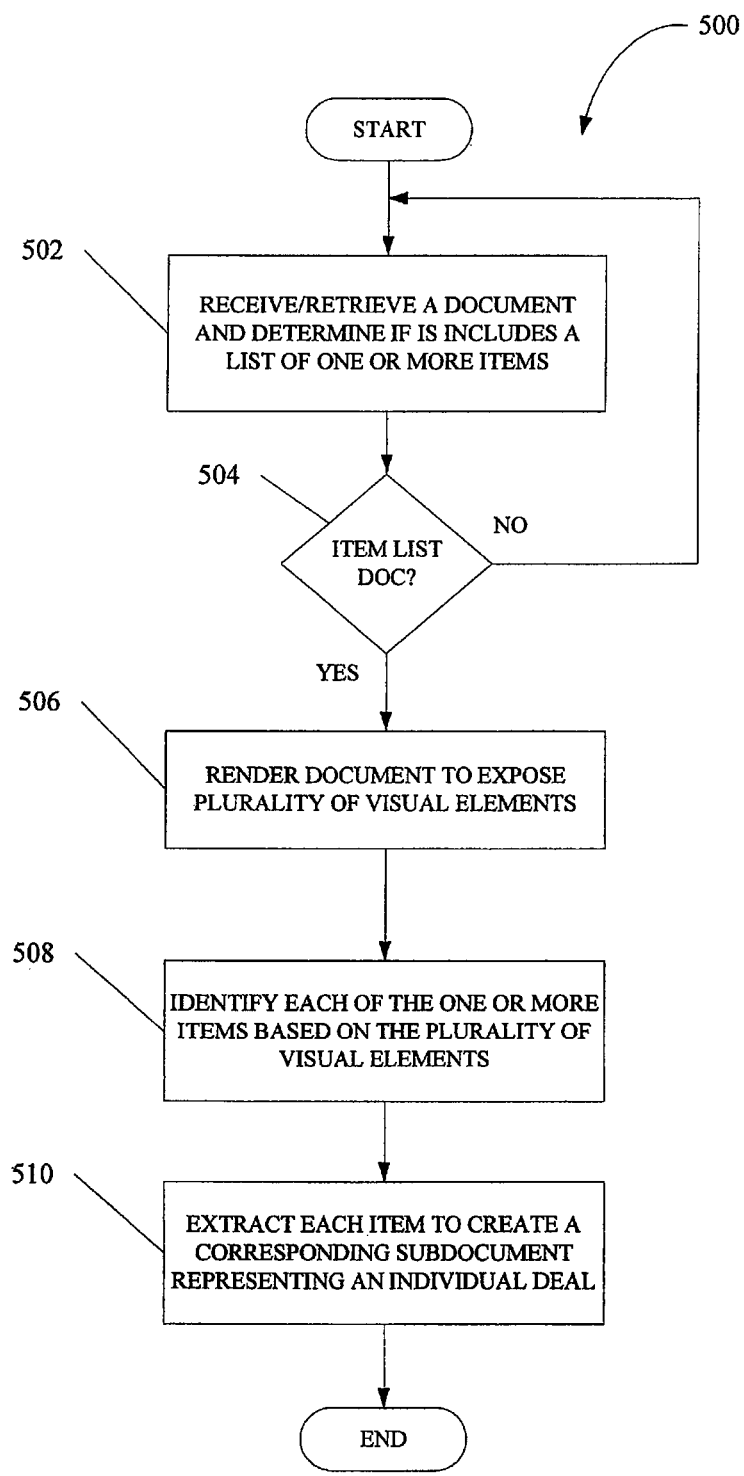
FIG. 5 is a flow chart of an overview of an example embodiment of a method for identifying and extracting items into subdocuments.

FIG. 5 is a flow chart of an overview of an example embodiment of a method 500 for identifying and extracting items into subdocuments. At operation 502 a document is received and it is determined if the document is an item-list document or a non-item-list document. If, at operation 504 it is determined it is not an item-list document, the method 500 returns to the start to analyze another document. If the document is an item-list document, the method 500 proceeds to operation 506 to render the document to expose a plurality of visual elements. At operation 508, one or more items are identified based on the exposed plurality of visual elements. In one embodiment, this identification is based on identifying element clusters and using bounding boxes to isolate each region of items and to next to isolate each item.

Finally, at operation 510, each item is extracted and a subdocument is created for each item. As mentioned above, each subdocument may then be indexed and stored.

Figure 6A:
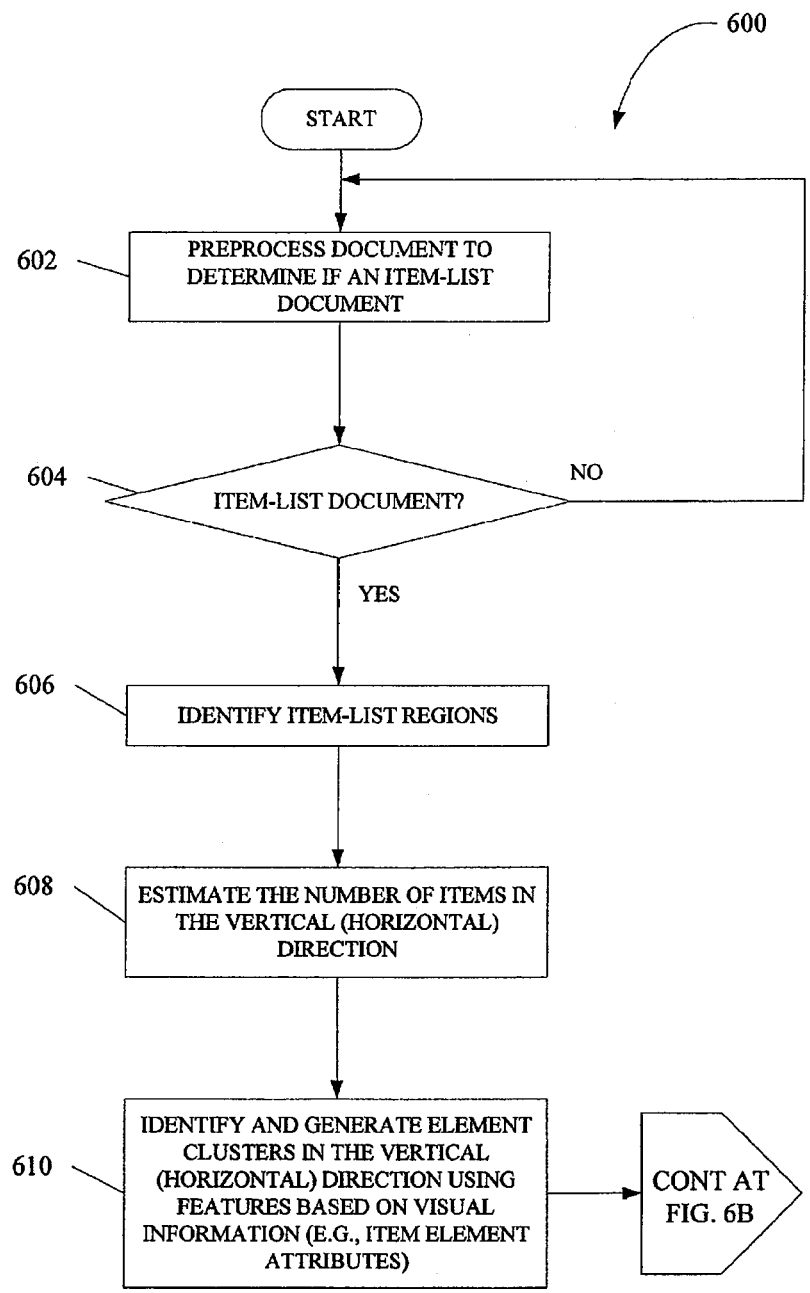
FIGS. 6A and 6B is a flow chart of an example embodiment of a method for identifying and extracting items into subdocuments.

FIGS. 6 (6A and 6B) is a flow chart of an example embodiment of a method 600 for identifying and extracting items into subdocuments. At operation 602, a document is preprocessed to determine if the document is an item-list document. If, at operation 604 it is determined it is not an item-list document, the method 600 returns to the start to analyze another document. If the document is an item-list document, the method 600 proceeds to operation 606 to identify item-list regions within the document. After one or more item-list regions have been identified, at operation 608, an estimate of the number of items in the vertical and horizontal direction is made for each identified item-list region. In one embodiment, the item-list regions are identified based on item attributes, such as relative positions and fonts of repeated item element types in the document (e.g., price elements identified by the character "$" and price elements identified by bold face or red type, etc.).

Next, at operation 610, repeated item elements types are identified initially in one of the vertical or horizontal directions for each item-list region (e.g., anchor tag elements, image elements, etc. in the vertical direction). Additionally, at operation 610, element clusters of repeated item elements are formed within each item-list region in one of the vertical or horizontal directions based on visual data such as item element attributes. In various embodiments, the formation of the element clusters depends on the orientation of the item-list regions. For example, an item-list region may only have items (e.g., products or "deals") in the vertical direction (e.g., item-list region 406), or may be an x by y matrix of items (e.g., item-list region 404), in which case the formation of element clusters may be initially either in the horizontal or the vertical direction with the opposite direction processed as described below.

Figure 6B:
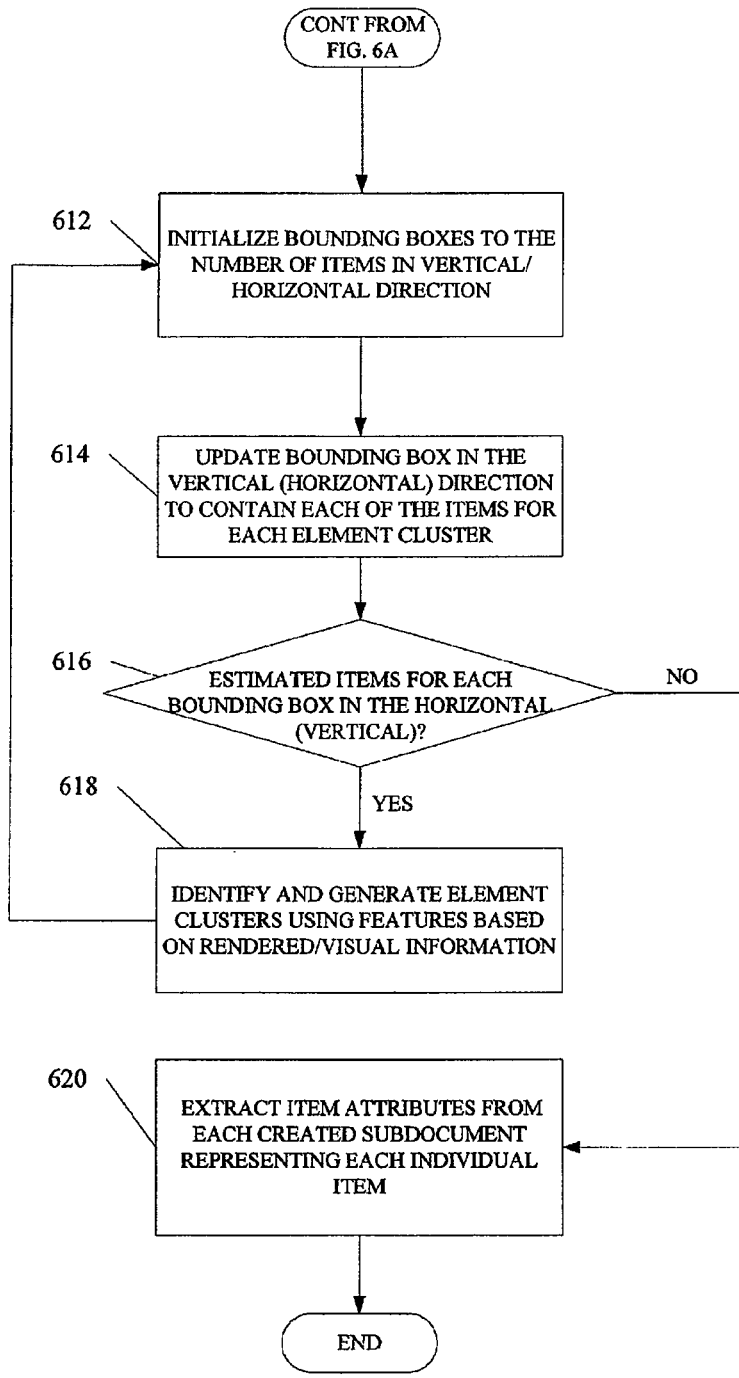

Continuing at FIG. 6B, the method 600 at operation 612 a bounding box is initialized for each item in the identified item-list region. The bounding boxes may be initialized in one of either the vertical or horizontal direction depending on the orientation of the item-list region. At operation 614 each bounding box is updated in a vertical or horizontal direction, depending on the initial bounding box orientation, until each corresponding member of the element cluster is contained within the bounding box (e.g., see FIG. 4B). If at operation 616, there are items in the direction opposite to that of operation 614 (e.g., items also estimated in the horizontal direction, an x by y matrix of items, see web page document 410) then the method 600 at operation 618 similarly to operation 610, identifies and generates item element clusters using features based on visual data such as item element attributes. The method then continues back to operation 612 to process the second dimension of items. Next, at operation 620, the item attributes from each bounding box are extracted and represent each individual item (deal) extracted from the item-list region and the original document (e.g., web page document 402). If, however, at operation 616 it is determined there are not any items estimated in the opposite direction (e.g., see FIG. 4D), the method 600 proceeds to operation 620 where item attributes are extracted as described above. In one embodiment, after the item attributes are extracted they may be indexed, stored and relevant subdocuments retrieved in subsequent searches.

Figure 7:
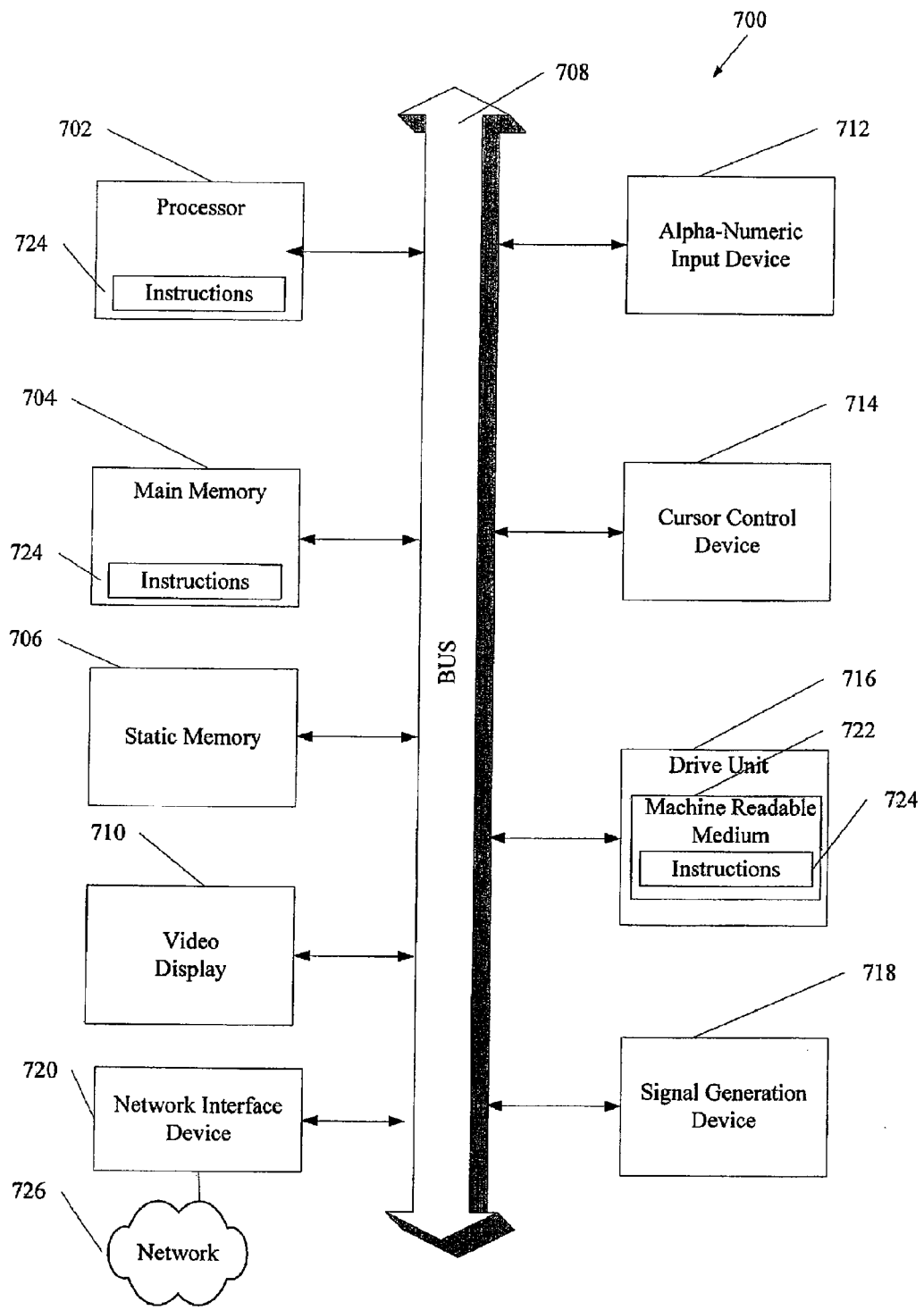
FIG. 7 shows a diagrammatic representation of machine in the example form of a computer system within which a set of instructions may be executed causing the machine to perform any one or more of the methodologies discussed herein.

FIG. 7 shows a diagrammatic representation of machine in the example form of a computer system 700 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. A method, including:
   making a determination whether a document is an item-list document, the item-list document having a visual area in the document where items are listed in a tabular format;
   based on a determination the document is an item-list document, processing the document, using one or more processors, to expose a plurality of item elements associated with one or more items of the document, the plurality of item elements including visual information used to render the document, the visual information including at least one of images and text;
   estimating a first number of items in a first direction and a second number of items in a second direction, the first number of items in the first direction corresponding to columns and the second number of items in the second direction corresponding to rows, each direction being relative to a two dimensional rendering of a first item-list region;
   identifying repeating item element types in at least one of the first direction and the second direction;
   creating an element cluster for each identified repeating element type, the element cluster having an orientation in either the first direction or the second direction;
   identifying each item of the one or more items based on one or more of the plurality of item elements and corresponding visual information;
   initializing a bounding box for each item of the one or more items including creating a first bounding box for each row having a width equal to a width of the column and an initial height of zero, and updating each of the first bounding boxes in the first direction until a single instance of each element cluster is within each first bounding box to create a number of new item-list regions corresponding to the number of rows;
   updating each of the bounding boxes in size individually to contain each of the items of the one or more items; and
   creating a subdocument for each of the items of the one or more items in the updated bounding boxes.

2. The method of claim 1, wherein the determining includes identifying repeating elements in the document as the item elements.

3. The method of claim 1, including extracting item attributes from each of the identified items and associated item elements.

4. The method of claim 1, wherein each subdocument includes attribute elements extracted from each of the items of the one or more items.

5. The method of claim 1, further including appending metadata to each subdocument.

6. The method of claim 1, further including indexing and storing each of the subdocuments.

7. The method of claim 1, wherein prior to the identifying of each item, identifying one or more item-list regions within the document, each of the one or more item-list regions including one or more items of the plurality of items.

8. The method of claim 7, wherein the identifying the one or more item-list regions includes using a document object model (DOM) of the document to identify elements associated with the one or more item-list regions.

9. The method of claim 1, wherein the processing and the identifying are independent of a written language of the document.

10. A system, including:
    a rendering module, including one or more processors, to
       make a determination whether a document is an item-list document, the item-list document having a visual area in the document where items are listed in a tabular format,
       based on a determination the document is an item-list document, to process the document to expose a plurality of item elements associated with one or more items of the document, the plurality of item elements including visual information used to render the document, the visual information including at least one of: images and text; and
    an element cluster module to
       estimate a first number of items in a first direction and a second number of items in a second direction, the first number of items in the first direction corresponding to columns and the second number of items in the second direction corresponding to rows, each direction being relative to a two dimensional rendering of a first item-list region,
       identify repeating item element types in at least one of the first direction and the second direction, and
       create an element cluster for each identified repeating element type, the element cluster having an orientation in one of either the first direction or the second direction; and
    a bounding box module to identify each item of the one or more items based on one or more of the plurality of item elements and corresponding visual information, initialize a bounding box for each item of the one or more items, create a first bounding box for each row having a width equal to a width of the column and an initial height of zero, and updating each of the first bounding boxes in the first direction until a single instance of each element cluster is within each first bounding box to create a number new item-list regions corresponding to the number of rows, update each of the bounding boxes in size individually to contain each of the items of the one or more items, and a post-processing module to create a subdocument for each of the items of the one or more items in the updated bounding boxes.

11. The system of claim 10, further including an extraction module to extract item attributes from each of the identified items and associated item elements.

12. The system of claim 11, wherein each subdocument includes the extracted attribute elements associated with each item.

13. The system of claim 10, further including a region identification module to identify repeating elements in the document as the item elements.

14. The system of claim 13, further including the region identification module to identify one or more item-list regions within the document based on the item elements, each of the one or more item-list regions including one or more items of the plurality of items.

15. The system of claim 14, wherein the region identification module uses a document object model (DOM) of the document to identify elements associated with the one or more item-list regions.

16. A tangible machine-readable storage device embodying instructions, the machine-readable storage device not including transitory signals, the instructions which, when executed by a machine, cause the machine to perform operations including:

making a determination whether a document is an item-list document, the item-list document having a visual area in the document where items are listed in a tabular format;

based on a determination the document is an item-list document, processing the document, using one or more processors, to expose a plurality of item elements associated with one or more items of the document, the plurality of item elements including visual information used to render the document, the visual information including at least one of: images and text;

estimating a first number of items in a first direction and a second number of items in a second direction, the first number of items in the first direction corresponding to columns and the second number of items in the second direction corresponding to rows, each direction being relative to a two dimensional rendering of a first item-list region;

identifying repeating item element types in at least one of the first direction and the second direction; and creating an element cluster for each identified repeating element type, the element cluster having an orientation in either the first direction or the second direction;

identifying each item of the one or more items based on one or more of the plurality of item elements and corresponding visual information;

initializing a bounding box for each item of the one or more items including creating a first bounding box for each row having a width equal to a width of the column and an initial height of zero, and updating each of the first bounding boxes in the first direction until a single instance of each element cluster is within each first bounding box to create a number of new item-list regions corresponding to the number of rows;

updating each of the bounding boxes in size individually to contain each of the items of the one or more items; and creating a subdocument for each of the items of the one or more items in the updated bounding boxes.

17. A method, including:

making a determination whether a document is an item-list document, the item-list document having a visual area in the document where items are listed in a tabular format;

based on a determination the document is an item-list document, processing the document, using one or more processors, to expose a plurality of item elements associated with one or more items of the document, the plurality of item elements including visual information used to render the document, the visual information including at least one of images and text;

estimating a first number of items in a first direction and a second number of items in a second direction, the first number of items in the first direction corresponding to columns and the second number of items in the second direction corresponding to rows, each direction being relative to a two dimensional rendering of a first item-list region;

identifying repeating item element types in at least one of the first direction and the second direction;

creating an element cluster for each identified repeating element type, the element cluster having an orientation in either the first direction or the second direction;

identifying each item of the one or more items based on one or more of the plurality of item elements and corresponding visual information;

initializing a bounding box for each item of the one or more items including creating a second bounding box for each new item-list region, each of the second bounding boxes having a height equal to the height of the row and an initial width of zero, and updating of the second bounding boxes until a single instance of each element cluster is within each second bounding box to create a number of individual items corresponding to the number of rows;

updating each of the bounding boxes in size individually to contain each of the items of the one or more items; and creating a subdocument for each of the items of the one or more items in the updated bounding boxes.

18. The method of claim 17, including extracting item attributes from each of the individual items defined within each of the second bounding boxes and creating a subdocument for each item including its corresponding item attributes.

19. A system, including:

a rendering module having one or more processors make a determination whether a document is an item-list document, the item-list document having a visual area in the document where items are listed in a tabular format, and based on a determination the document is an item-list document, to process the document to expose a plurality of item elements associated with one or more items of the document, the plurality of item elements including visual information used to render the document, the visual information including at least one of: images and text;

an element cluster module to
- estimate a first number of items in a first direction and a second number of items in a second direction, the first number of items in the first direction corresponding to columns and the second number of items in the second direction corresponding to rows, each direction being relative to a two dimensional rendering of a first item-list region,
- identify repeating item element types in at least one of the first direction and the second direction, and
- create an element cluster for each identified repeating element type, the element cluster having an orientation in one of either the first direction or the second direction; and a bounding box module to
- identify each item of the one or more items based on one or more of the plurality of item elements and corresponding visual information,
- initialize a bounding box for each item of the one or more items,
- create a second bounding box for each new item-list region, each of the second bounding boxes having a height equal to the height of the row and an initial width of zero, and updating of the second bounding boxes until a single instance of each element cluster is within each second bounding box to create a number of individual items corresponding to the number of rows,
- update each of the bounding boxes in size individually to contain each of the items of the one or more items, and
- a post-processing module to create a subdocument for each of the items of the one or more items in the updated bounding boxes.

20. The system of claim 19, further including an extraction module to extract item attributes from each of the items defined within each of the second bounding boxes and creating a subdocument for each item including its corresponding item attributes.

* * * * *